C. MAUL.
GRAIN HARVESTER.
APPLICATION FILED OCT. 17, 1919.
1,435,724.
Patented Nov. 14, 1922.
3 SHEETS—SHEET 1.
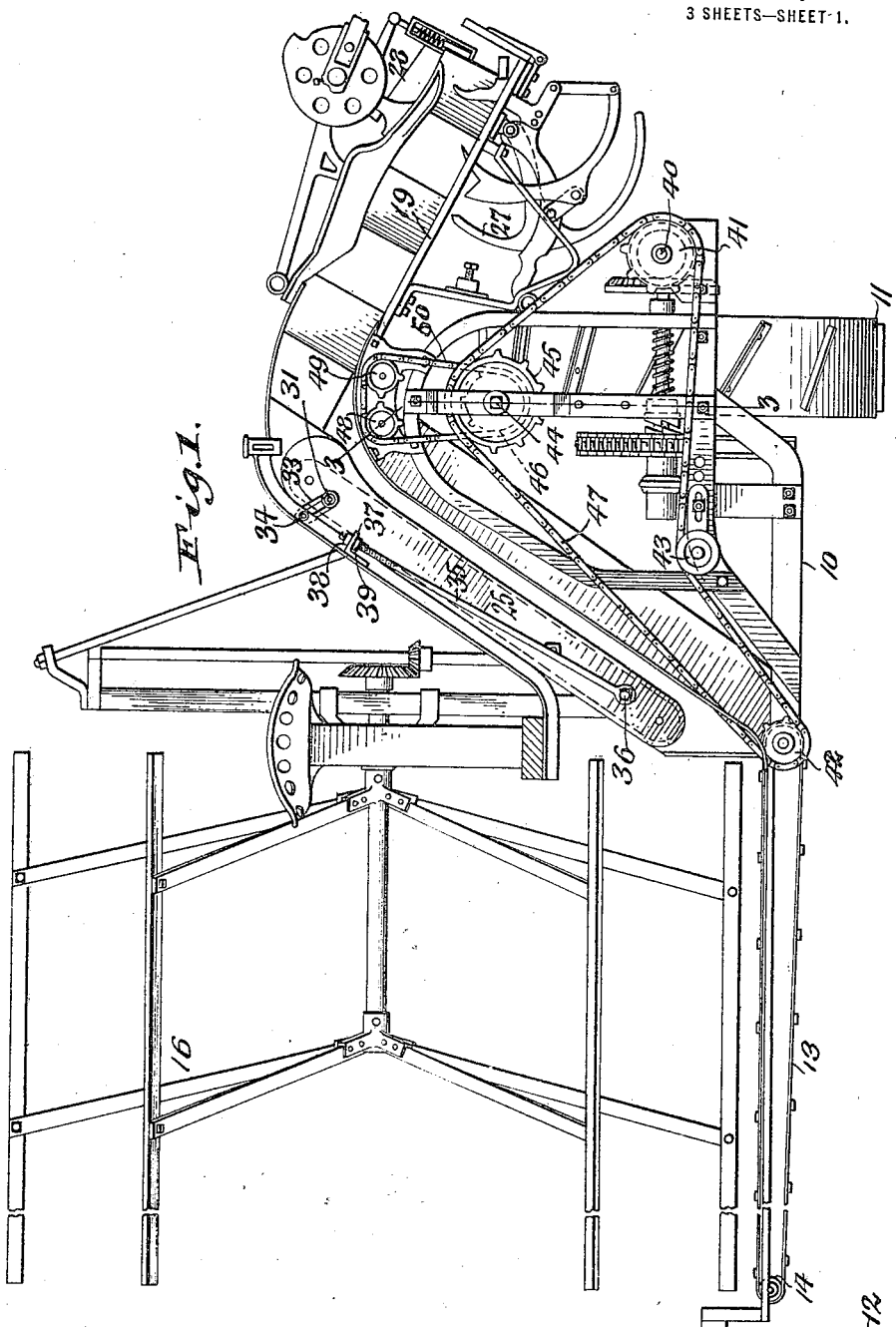

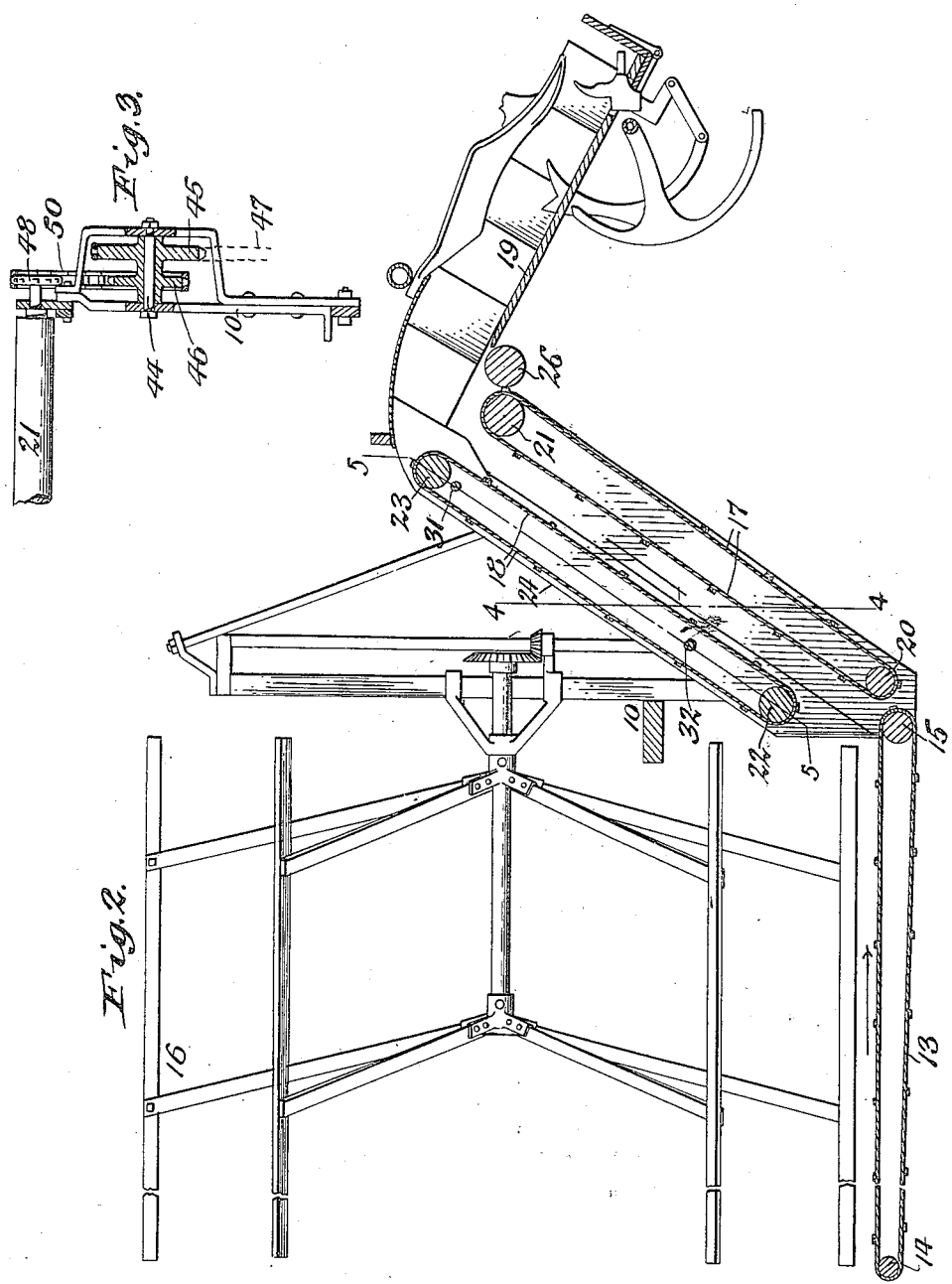

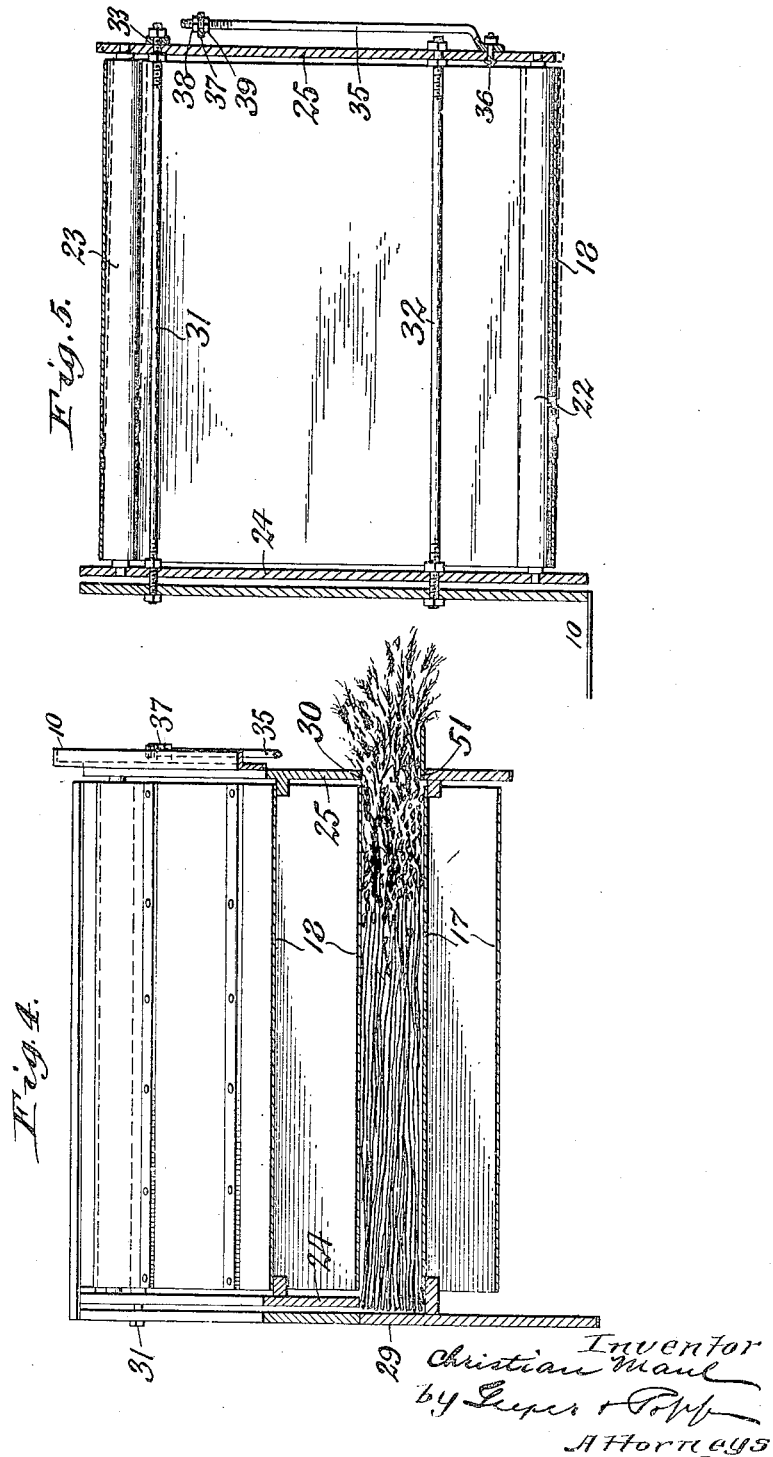

Patented Nov. 14, 1922.

1,435,724

UNITED STATES PATENT OFFICE.

CHRISTIAN MAUL, OF BATAVIA, NEW YORK, ASSIGNOR TO MASSEY-HARRIS HARVESTER COMPANY, INC., OF BATAVIA, NEW YORK, A CORPORATION OF NEW YORK.

GRAIN HARVESTER.

Application filed October 17, 1919. Serial No. 331,417.

*To all whom it may concern:*

Be it known that I, CHRISTIAN MAUL, a citizen of the United States, residing at Batavia, in the county of Genesee and State of New York, have invented new and useful Improvements in Grain Harvesters, of which the following is a specification.

This invention relates to a grain havester and more particularly to the means for adjusting the upper elevator apron or belt, so that the same runs parallel with the companion lower elevator belt, and also to the driving mechanism for the lower apron or belt of the elevator.

The object of this invention is to provide simple and efficient means whereby the upper elevator apron may be adjusted without taking off the apron or otherwise partly dismantling the machine, thus saving time and labor and avoiding undue interruption in the operation of the machine.

A further object of this invention is to provide a driving mechanism for the lower elevator apron which will operate without partly threshing the heads of the long grain, also to reduce the wear on the parts and avoid undue noise.

In the accompanying drawings: Figure 1 is a rear elevation, partly in section, of a grain harvester embodying my improvements. Figure 2 is a fragmentary, vertical longitudinal section of the machine. Figure 3 is a fragmentary vertical transverse section taken on line 3—3, Fig. 1. Figures 4 and 5 are fragmentary vertical sections taken on the corresponding numbered lines in Fig. 2.

Similar characters of reference indicate corresponding parts throughout the several views.

10 represents the main frame of the harvester which may be of any suitable construction to support the several working parts and which is supported on the stubbleward side by a master wheel 11 and on the grainward side by a supporting wheel 12.

On the grainward end of the frame is arranged a horizontal conveyer which receives the grain from the cutter mechanism and delivers the same to the elevator, whereby the grain is elevated over the master wheel and presented to the binder mechanism which ties bands around bundles of the grain. This horizontal conveyer is of usual and well known form and preferably comprises a canvas apron or belt 13 which passes at its grainward and stubbleward turns around supporting rollers 14, 15 journaled on the main frame. This horizontal conveyer moves with its upper operative stretch from the grainward side toward the stubbleward side of the machine and the grain is directed upon the same from the cutter mechanism by the usual rotary reel 16.

The elevator comprises lower and upper inclined canvas aprons or belts 17, 18, which extend upwardly at an angle from the delievery turn of the horizontal conveyer to the upper or receiving end of the downwardly-inclined binder deck 19. The lower elevator apron passes with its lower and upper turns around horizontal receiving and delivery rollers 20, 21, which are journaled transversely on the lower and upper parts of the main frame, this apron being operated to move upwardly with its upper stretch. The upper elevator apron passes with its lower and upper turns around horizontal receiving and delivery rollers 22, 23 which are journaled transversely in two supporting bars or plates 24, 25, arranged transversely and in an inclined position relatively to the main frame at the front and rear sides of the elevator. The lower stretch of the upper apron moves upwardly, so that the grain discharged from the horizontal conveyer will be received between the opposing stretches of the two elevator aprons and carried upwardly to the binder deck. In passing from the elevator aprons to the deck the grain is engaged by an intermediate clearing roller 26 which is journaled horizontally and transversely on the main frame in the gap between the elevator and the deck.

As the grain slides down the binder deck the same is received between the needle 27 and the knotter 28 of the bundling and tying mechanism which is arranged adjacent to the lower part of the deck and which may be of any suitable construction to tie bands around the bundles of grain which are being harvested.

The space or passageway between the elevator aprons is closed on the front side of this space by the adjacent wall 29 which is mounted on the main frame and which faces the but ends of the grain, as shown in Fig. 4, while the rear side of this space or passageway is open and forms a gap or throat 30 through which the heads of the grain of varying length project rearwardly therefrom. This necessitates mounting the rollers of the upper elevator apron on a rearwardly overhanging supplemental frame which is supported at its front side on the main frame. In its preferred form this overhanging frame comprises the two longitudinal side plates or bars 24, 25, which are arranged at the front and rear sides of the elevator and on which the rollers of the upper apron are journaled and two horizontal tie rods 31, 32 passing transversely through the lower and upper ends of the side plates and connecting the same with each other and with the adjacent front wall 29 of the inclined grain passage.

Owing to the overhang of the supplemental frame, means are provided for adjusting the same in a plane parallel with the path of the grain through the elevator in order to maintain the rollers of the upper elevator apron parallel with those of the lower apron and cause the upper apron to run properly and most efficiently. For this purpose the rear end of the overhanging supplemental frame is adjustably connected with the adjacent part of the main frame as follows:

33 represents an upright link which is engaged at its upper end with a pin 34 on the upper part of the main frame, while its lower end engages with a projection on the upper part of the rear plate 25 of the supplemental frame, which projection may consist of the upper tie rod 31, as shown in Figs. 1 and 5 of the drawings, although a separate projection may be employed if desired. This connection between the main frame and the rear part of the supplemental frame permits the upper elevator apron and associated parts to rise and fall in adapting itself to variations in the thickness of the mass of grain which is being harvested and also permits the rear end of the supplemental frame to be freely adjusted parallel with the path of the grain through the elevator for obtaining proper running of the upper elevator apron.

The preferred means for effecting this adjustment of the supplemental frame comprises a shifting rod 35 arranged lengthwise of the rear plate 25 of the supplemental frame and connected at its lower end with this frame by a pin 36, as shown in Fig. 1, or by other suitable means, a perforated bracket 37 secured to the upper part of the main frame and receiving the upper end of said shifting rod, and screw nuts 38, 39 applied to the threaded upper end of said rod and engaging with the opposite sides of the bracket 37. Upon loosening one of the screw nuts 38, 39, and tightening the other, the shifting rod and the rear part of the supplemental frame are moved up or down parallel with the path of the grain through the elevator. By this means the upper elevator apron can be adjusted so that the same runs true to the lower elevator apron while the machine is running and without requiring the operator to reach into the interior of the machine or taking off any of the canvas aprons, inasmuch as the adjusting devices for this purpose are on the exterior of the machine. This adjustment of the rear part 25 of the supplemental frame is permissible by reason of the fact that the same is movably connected with the relatively stationary front part 24 of this frame by the rods 31, 32 and other connections which yield sufficiently to enable the rear plate 25 and the bearings therein for the rollers 22, 23 to be adjusted as may be necessary. In Fig. 5 the two rollers of the upper elevator apron are represented by dotted lines in a position in which the supplemental frame has sagged out of its normal position while the full lines show the same restored to the proper position by the adjusting device.

Improved means are provided for driving the grain conveying mechanism which embody my improvements and are constructed as follows:

40 represents one of the driving shafts of the machine which is journaled horizontally and transversely in the lower stubbleward part of the main frame and operatively connected with the master wheel 11 so as to be driven thereby in the usual and well known manner. This shaft is provided at one end with a sprocket wheel 41 and the corresponding end of the shaft of the delivery roller 15 of the horizontal conveyer apron is provided with a sprocket wheel 42. The intermediate part of the main frame carries a tightener wheel 43 which is adjustably secured to the main frame.

44 represents an intermediate shaft which is journaled horizontally and transversely on the main frame below the upper delivery roller 21 of the lower apron and the clearing roller 26. This shaft is provided with a large intermediate sprocket wheel 45 and a small intermediate sprocket wheel 46 which are arranged side by side and operatively connected so that they turn together. 47 represents a main sprocket chain belt passing around the sprocket wheels 41, 42, 45, and around the tightener wheel 43, whereby power is transmitted to the horizontal conveyer-apron for operating the same. 48, 49 represent sprocket pinions secured to the rear ends of the shafts of the upper roller 21 of the lower elevator apron and the clearing roller 26, so that these pinions are in line with each other and with the small sprocket wheel 46. 50 represents an intermediate sprocket chain belt passing around the intermediate sprocket wheel 46 and the sprocket pinions 48, 49 for transmitting power to the lower elevator apron and the clearing roller.

This manner of driving the lower elevator apron, the horizontal conveyor apron and the clearing roller causes that stretch of the belt 47 between the sprocket wheel 42 of the horizontal conveyor belt and the large intermediate sprocket wheel 45 to be arranged below the gap or throat 30 between the rear parts of the main frame and the supplemental frame associated with the grain elevator, thereby preventing this portion of said belt from engaging with the heads of the grain while passing through this gap or throat and avoiding thrashing out some of the grain of these heads which otherwise would occur, particularly when the grain is long. Furthermore, by arranging the chain belt 47 below the throat or gap of the elevator passage, this chain cannot slap against the top of the lower elevator frame, as heretofore and produce undue noise and wear. Moreover, this driving mechanism reduces the amount of gearing heretofore required for this purpose, and it also affords a larger passageway for the heads of the grain through which the same can pass more freely and without any pronounced offset on the underside of the throat, but instead permits of forming a bearing surface for the grain heads which is substantially even with the adjacent surface of the operative stretch of the lower elevator apron, as shown at 51 in Fig. 4, thereby avoiding any tendency to unduly bend the heads of grain and partly threshing the same which otherwise would result in unnecessary loss of grain.

I claim as my invention:

1. A harvester comprising a horizontal conveyor having a sprocket wheel, an elevator having a sprocket wheel, an intermediate shaft having two intermediate sprocket wheels, a driving shaft provided with a sprocket wheel, a main sprocket chain belt passing around one of said intermediate sprocket wheels and around the sprocket wheels of said driving shaft and horizontal conveyor, and a sprocket chain belt passing around the other intermediate sprocket wheel and said elevator sprocket wheel.

2. A harvester comprising a horizontal conveyor having a sprocket wheel, an elevator having a sprocket wheel, an intermediate shaft having two intermediate sprocket wheels, a driving shaft provided with a sprocket wheel, a main sprocket chain belt passing around one of said intermediate sprocket wheels and around the sprocket wheels of said driving shaft and horizontal conveyor, a clearing roller provided with a sprocket wheel, and an intermediate sprocket chain belt passing around the other intermediate sprocket wheel and around the sprocket wheels of said elevator and clearing roller.

3. A harvester comprising a horizontal conveyor having a sprocket wheel, an elevator having a sprocket wheel, an intermediate shaft having two intermediate sprocket wheels, a driving shaft provided with a sprocket wheel, a main sprocket chain belt passing around one of said intermediate sprocket wheels and around the sprocket wheels of said driving shaft and horizontal conveyor, a clearing roller provided with a sprocket wheel, and an intermediate sprocket chain belt passing around the other intermediate sprocket wheel and around the sprocket wheels of said elevator and clearing roller, said elevator sprocket wheel and clearing roller sprocket wheel being arranged side by side and above said intermediate sprocket wheels, and that portion of the main sprocket chain belt between the horizontal conveyor sprocket wheel and the respective intermediate sprocket wheel being arranged below the path of the grain while the same is being moved by said elevator.

CHRISTIAN MAUL.